(12) United States Patent
Shoki

(10) Patent No.: US 6,360,174 B1
(45) Date of Patent: Mar. 19, 2002

(54) APPARATUS FOR DETECTING QUANTITY LEVEL OF RESIDUAL INK IN INK CARTRIDGE

(75) Inventor: Mikio Shoki, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 09/304,604

(22) Filed: May 4, 1999

(30) Foreign Application Priority Data

May 8, 1998 (JP) .......................................... 10-126361

(51) Int. Cl.$^7$ .............................................. G01F 23/70
(52) U.S. Cl. .............................................. 702/55; 347/7
(58) Field of Search ...................... 702/55, 51; 73/149, 73/290 R, 291, 861.01, 861.02; 347/7, 19, 86

(56) References Cited

U.S. PATENT DOCUMENTS

| | | | |
|---|---|---|---|
| 5,818,471 A | * 10/1998 | Shimamura et al. | 347/7 |
| 5,966,144 A | * 10/1999 | Edwards | 347/7 |
| 5,975,688 A | * 11/1999 | Kanaya et al. | 347/86 |
| 6,116,715 A | * 9/2000 | Lefebvre et al. | 347/19 |
| 6,126,266 A | * 10/2000 | Numata et al. | 347/23 |
| 6,151,039 A | * 11/2000 | Hmelar et al. | 347/7 |
| 6,161,915 A | * 12/2000 | Bolash et al. | 347/19 |
| 6,188,413 B1 | * 2/2001 | Kang | 347/7 |

FOREIGN PATENT DOCUMENTS

| | | |
|---|---|---|
| JP | 3-58854 | 3/1991 |
| JP | 4-316856 | 11/1992 |

* cited by examiner

*Primary Examiner*—Patrick Assouad
*Assistant Examiner*—Edward Raymond
(74) *Attorney, Agent, or Firm*—Lackenbach Siegel Marzullo Aronson & Greenspan, P.C.

(57) ABSTRACT

An ink level detecting apparatus comprises an ink cartridge, which is to be mounted in a printer, having an ID including cartridge type information and an identifying code, a fundamental data storing section for previously storing cartridge type information and ink capacity information associated therewith of ink cartridges which are to be mounted in the printer; a counting section for counting the number of ink dots jetted from the ink cartridge; an ink quantity storing section for storing residual ink quantities in ink cartridges mounted on the printer in association with identifying codes thereof; an ink quantity calculating section for reading the ID of the ink cartridge mounted in the printer to read out the residual ink quantity from the ink quantity storing section based on the identifying code in the ID, to read out the ink capacity from the fundamental data storing section based on the type information in the ID only when the residual ink quantity associated with the identifying code is absent in the ink quantity storing section, and to thus calculate new residual ink quantity based on the number of ink dots counted by the counting section and one of the residual ink quantity read from the ink quantity storing section and the ink capacity read from the fundamental data section; and an ink quantity memory control section for storing the new residual ink quantities calculated by the ink quantity calculating section into the ink quantity storing section in an updating manner.

10 Claims, 3 Drawing Sheets

APPARATUS FOR DETECTING QUANTITY LEVEL OF RESIDUAL INK IN INK CARTRIDGE

BACKGROUND OF THE INVENTION

This invention relates to an apparatus for detecting a quantity level of residual ink remaining within an ink cartridge. More particularly, the present invention relates to such an apparatus effectively operable when it is applied to a printer which operates while selectively using the same or different types of ink cartridges attached thereto as the current printing condition requires.

There are various proposals on the apparatus for detecting a quantity level of ink left in the ink cartridge (referred to as an ink-level detecting apparatus).

For example, there is disclosed in Unexamined Japanese Patent Publication No. 3-58854 a residual ink level indicator comprising: a counting section for counting print dot signal; a storage section for storing count data received from the counting section in the form of accumulation data; and a detecting section for detecting a quantity level of ink left within the ink cartridge by use of the data stored in the storage section (hereinafter, referred as a first related art).

Besides, there is disclosed in Unexamined Japanese Patent Publication No. 4-316856 an apparatus for detecting a quantity level of residual ink in an ink jet printer comprising: printable-dot number storage section for storing the number of printable dots corresponding to the total ink capacity of an ink cartridge; a printed-dot number storage section for storing the number of dots actually printed with the printed; a memory control section for additively storing the quantity of sucked ink in the form of the number of printed dots into the printed-dot number storage section every time priming section operates; and residual-ink-level detecting section for producing a quantity level of residual ink by use of the number of printable dots and the number of printed dots (hereinafter, referred as a second related art).

The first and second related arts are each able to detect a quantity level of ink left in an ink cartridge attached to the printer.

In the field of recent ink jet printers, the market demands full-color printing ability and use of water-resistant ink. To meet the market demand, some types of recent printers are designed such that different types of ink cartridges may be attached to one printer. Specifically, in some jet printers, two types of ink cartridges (e.g., a black ink cartridge and a color ink cartridge) may be attached to one printer. With the diversification of the printing styles and increase of the number of ink cartridges attached, a chance will increase where the ink cartridge of which ink is not used up is removed and replaced with another cartridge.

Meanwhile, in recent days, there increases a facsimile machine having additional functions, for example, printer and scanner functions. In other words, the monofunctional facsimile machine is free from the replacement of the ink cartridge. The cartridge replacement is inevitable to the multi-functional facsimile machine, however. This is because when it functions as a printer, the color printing and use of the water-resistant ink are unavoidable, and a required ink cartridge must be selected and used instead.

Thus, the ink jet printer and the facsimile machines are operated while selectively using different types of ink cartridges attached thereto as the current printing condition requires. In this case, it is essential for the user to know a quantity of ink left at present in an ink cartridge that is already used; otherwise, the following problem would arise. When the ink cartridge is replaced with another cartridge during the printing, and a quantity of ink remaining within the selected and replaced cartridge is small, printed characters will blur during the printing process. In this case, the print thus far made must be discarded. This is uneconomical.

The first and second related arts are designed on the assumption that the ink cartridge attached to the printer is not detached from it till the cartridge is depleted. This fact rejects direct application of the techniques of the first and second related arts to the recent ink jet printer and the facsimile machine which each selectively use different types of ink cartridges.

Further, when a residual ink level of one ink cartridge is detected, and the cartridge is detached from the printer and another ink cartridge is attached thereto, neither of those related arts can recognize whether the replaced cartridge was used, and hence cannot exactly detect a residual ink level therein.

SUMMARY OF THE INVENTION

It is therefore an object of the present invention is to provide an ink-level detecting apparatus effectively operable even when an ink cartridge that is already used is attached again to the printer.

In order to achieve the above object, there is provided an ink level detecting apparatus comprising: an ink cartridge, which is to be mounted in a printer, having an ID including cartridge type information and an identifying code; a fundamental data storing section for previously storing cartridge type information and ink capacity information associated therewith of ink cartridges which are to be mounted in the printer; a counting section for counting the number of ink dots jetted from the ink cartridge; an ink quantity storing section for storing residual ink quantities in ink cartridges mounted on the printer in association with identifying codes thereof; an ink quantity calculating section for reading the ID of the ink cartridge mounted in the printer to read out the residual ink quantity from the ink quantity storing section based on the identifying code in the ID, to read out the ink capacity from the fundamental data storing section based on the type information in the ID when the residual ink quantity associated with the identifying code is absent in the ink quantity storing section, and to thus calculate new residual ink quantity based on the number of ink dots counted by the counting section and one of the residual ink quantity read from the ink quantity storing section and the ink capacity read from the fundamental data section; and an ink quantity memory control section for storing the new residual ink quantities calculated by the ink quantity calculating section into the ink quantity storing section in an updating manner.

According to the present invention, there is also provided an ink level detecting apparatus comprising: an ink cartridge, which is to be mounted in a printer, having an ID including cartridge type information and an identifying code; a fundamental data storing section for previously storing cartridge type information and ink capacity information associated therewith of ink cartridges which are to be mounted in the printer; a counting section for counting the number of ink dots jetted from the ink cartridge; a dot number storing section for storing an accumulation of the numbers of jetted ink dots of ink cartridges mounted on the printer in association with identifying codes thereof; an ink quantity calculating section for reading the ID of the ink cartridge mounted in the printer to read out the accumulated dot number from the dot number storing section based on the identifying code in the ID, to read out the ink capacity from the fundamental data storing section based on the type information in the ID, and to thus calculate new residual ink quantity based on the number of ink dots counted by the counting section, the accumulated ink dot number read from the dot number storing section and the ink capacity read from the fundamental data section; and an ink quantity memory control section for storing new accumulated ink dot number, which is obtained by the ink dot number counted by the counting section, into the dot number storing section.

These appratuses further comprise a display section for displaying the residual ink quantity of the ink cartridge mounted on the printer which is stored in the ink quantity storing section according to the identifying code in the ID of the ink cartridge.

These appratuses further comprise an alarming section for generating an alarm when the calculated residual ink quantity is lower than a predetermined quantity level.

According to the present invention, there is also provided an ink level detecting apparatus comprising: an ink cartridge, which is to be mounted in a printer, having a nonvolatile memory in which residual quantity of ink therein is stored; a counting section for counting the number of ink dots jetted from the ink cartridge; an ink quantity calculating section for reading out the residual ink quantity from the nonvolatile memory to calculate new residual ink quantity based on the number of ink dots counted by the counting section and the residual ink quantity; and an ink quantity memory control section for storing the new residual ink quantities calculated by the ink quantity calculating section into the nonvolatile memory in an updating manner.

The appratus further comprises a display section for displaying the residual ink quantity stored in the nonvolatile memory.

In the apparatus, type information of the ink cartridge may be stored in the nonvolatile memory.

These appratuses may be mounted on the printer in which the cartridge is to be mounted.

These appratuses may be mounted on a host computer to which a plurality of printers in which the cartridge is to be mounted.

DETAILED DESCRIPTION OF THE PREFERRED EMBODIMENTS

The preferred embodiment of the present invention will be described with reference to the accompanying drawings.

Figure 1:
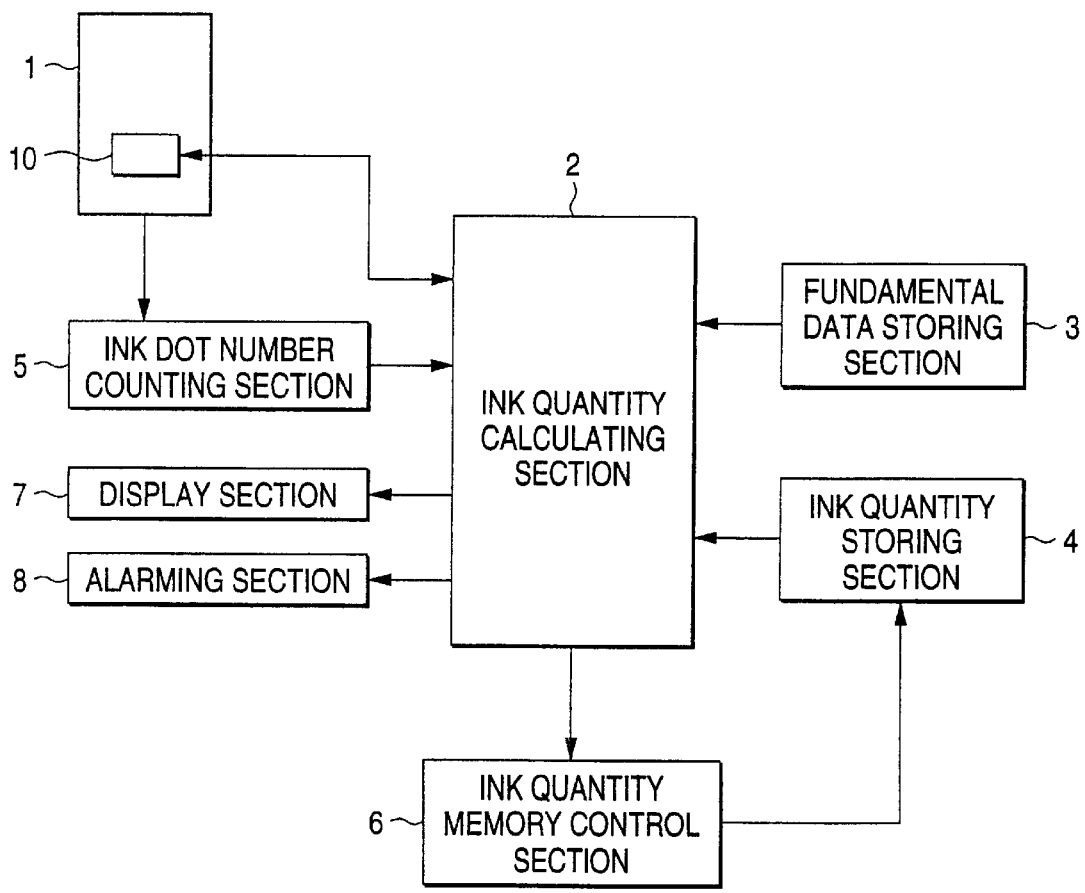
FIG. 1 is a block diagram showing an electrical configuration of a first embodiment according to an ink-level detecting apparatus of the present invention.

FIG. 1 is a block diagram showing an electrical configuration of an ink-level detecting apparatus according to a first embodiment of the present invention.

An ink cartridge 1 comprises an ID 10 (serial ID in the embodiment) on which type information of and an identifying code proper to the cartridge) are indicated. The type information include information indicative of colors of the cartridges, such as a black ink cartridge, a color ink cartridge (e.g., yellow, magenta and cyan ink cartridge) and a photo ink cartridge (e.g., black, light magenta and light cyan cartridge), and information indicative of an ink capacity of the cartridge. The identifying code represents the manufacturing number of the cartridge. The manufacturing number is conventionally a serial number marked on the cartridge body. Therefore, it never happens that the same number is marked on different cartridges. In this respect, the manufacturing number is convenient for identifying the ink cartridge. Another number may be used instead, if it is able to definitely specify each ink cartridge.

An ink quantity calculating section 2 is connected to a fundamental data storing section 3 and an ink quantity storing section 4. The ink quantity calculating section 2 reads information from the serial ID 10 of the ink cartridge 1. The fundamental data storing section 3 stores in advance type information of ink cartridges 1 that may be attached to a printer (not shown) and the ink capacity information associated with the cartridge type information. The ink quantity storing section 4 stores the quantities of ink left in an ink cartridge 1 in association with an identifying code thereof. Specifically, the fundamental data storing section 3 stores information indicative of colors, such as a black ink cartridge, a color ink cartridge and a photo ink cartridge, and information of ink capacities (e.g., normal capacity, large capacity) in a factory.

An ink-dot number counting section 5 inputs, upon occasion, a count (indicative of the number of ink dots) to the ink quantity calculating section 2. The ink-dot number counting section 5 counts the number of ink dots jetted from the ink cartridge 1, which is attached to the printer. (The number of ink dots is counted for each color in the case of the color printer.)

A display section 7 and an alarming section 8 are coupled to the ink quantity calculating section 2. The display section 7 displays an ink level of ink left in the cartridge 1 that is attached to the printer. The alarming section 8 generates an alarm when ink is depleted in the ink cartridge 1 and its quantity lowers to below a predetermined quantity level.

The ink quantity calculating section 2 is coupled for transfer to ink quantity memory control section 6, and the section 6 is coupled for transfer to the ink quantity storing section 4.

The ink quantity calculating section 2 reads out the contents of the serial ID 10 on the ink cartridge 1 attached to the printer, and reads out the residual ink quantity associated with the identifying code on the serial ID 10 from the ink quantity storing section 4 at the time of printing. If the residual ink quantity associated with the identifying code is not stored in the ink quantity storing section 4, the ink quantity calculating section 2 reads out an ink capacity of a cartridge, which is specified by type information read from the serial ID 10, from the fundamental data storing section 3. The ink quantity calculating section 2 calculates a new quantity of residual ink by use of a count representative of the number of ink dots, which is derived from the ink-dot number counting section 5, and a residual ink quantity read out of the ink quantity storing section 4 or an ink capacity read out of the fundamental data storing section 3.

The ink quantity memory control section 6 stores, in an updated manner, the new ink quantities calculated by the ink quantity calculating section 2 into memory locations in the ink quantity storing section 4, which are associated with the respective identifying codes.

The display section 7 displays an ink quantity stored into the ink quantity storing section 4 which is specified by the identifying code contained in the serial ID 10 of the ink cartridge 1 attached to the printer.

Figure 2:
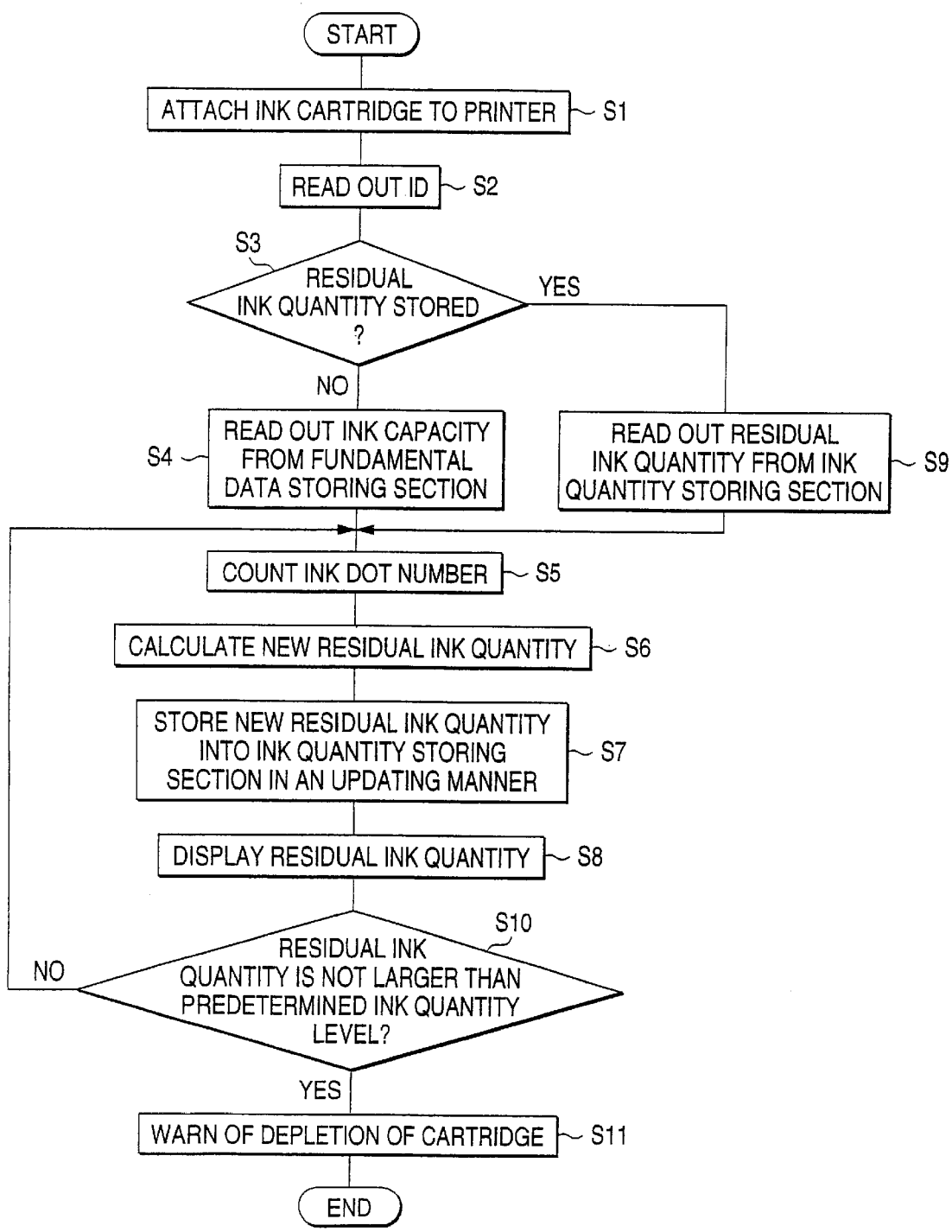
FIG. 2 is a flow chart showing residual ink level detecting operations of the ink-level detecting apparatus of FIG. 1.

Operations of the ink-level detecting apparatus thus constructed will be described with reference to FIG. 2 showing a flow chart.

Step S1 in the flow chart: One cartridge 1a is attached to the printer. Step S2: The ink quantity calculating section 2 outputs a serial clock signal to a serial ID 10 of the ink cartridge 1a, and reads out type information of the ink cartridge 1a and the identifying code proper to the same from the serial ID. In this instance, the type information of the ink cartridge 1a is a black ink cartridge of normal capacity and the identifying code is (001).

Step S3: The ink quantity calculating section 2 checks whether a residual ink quantity specified by the identifying code (001) is stored in the ink quantity storing section 4. If the attached ink cartridge 1a specified by the identifying code (001) is a new cartridge, the residual ink quantity specified by (001) is not stored in the ink quantity storing section 4. Then, a step S4 is executed. Step S4: The ink quantity calculating section 2 uses the type information (the black ink cartridge of the normal capacity) read out of the serial ID 10, and reads out the ink capacity (number of ink dots) Xo of the cartridge type from the fundamental data storing section 3.

Step S5: Upon start of the printing, the ink-dot number counting section 5 counts the number of dots jetted from the ink cartridge 1a, and inputs a count Xn representative of the number of ink dots to the ink quantity calculating section 2.

Step S6: The ink quantity calculating section 2 calculates a new residual ink quantity (number of ink dots) Xa=Xo−Xn by use of the ink capacity (number of ink dots) Xo of the cartridge type read from the fundamental data storing section 3 and the count Xn received from the ink-dot number counting section 5.

Step 7: The ink quantity memory control section 6 stores the new residual ink quantity (number of ink dots) Xa, which is obtained by the ink quantity calculating section 2, into a new memory location of the identifying code (001) in the ink quantity storing section 4 in an updating manner.

Step 8: The ink quantity calculating section 2 causes the display section 7 to display the ink capacity (number of ink dots) Xo read out of the fundamental data storing section 3 as the result of attaching the ink cartridge 1a to the printer as a residual ink quantity, and the new residual ink quantity (number of ink dots) Xa of the ink cartridge 1a which is calculated by the ink quantity calculating section 2 while printing. From the display, the user visually knows an ink level of ink left at present in the ink cartridge 1a attached to the printer. Therefore, he can check whether a sufficient quantity of ink is left in the ink cartridge before printing.

An operation of the ink-level detecting apparatus when another ink cartridge 1b is attached to the printer, instead of the ink cartridge 1a, will be described.

The ink cartridge 1a is detached from the printer, and another ink cartridge 1b is attached to the printer (step S1). The ink quantity calculating section 2 outputs a serial clock signal to a serial ID 10 of the ink cartridge 1b, and reads out type information of the ink cartridge 1b and the identifying code proper to the same from the serial ID (step S2).

In this instance, the type information of the ink cartridge 1b is a color ink cartridge of high capacity and the identifying code is (002). Further, the ink cartridge 1b is already used but contains ink therein. Therefore, a residual ink quantity (number of ink dots) Ya specified by the identifying code (002) is already stored in the ink quantity storing section 4. The residual ink quantity Ya, actually, includes the quantities of yellow, magenta and cyan inks. In the description to follow, the residual ink quantity (number of ink dots) Ya represents the quantity of only yellow ink left, for simplicity of explanation.

The ink quantity calculating section 2 reads out the residual ink quantity (number of ink dots) Ya of the identifying code (002) from the ink quantity storing section 4 in accordance with the identifying code (002) (steps S3, S9).

Upon start of the printing, the ink-dot number counting section 5 counts the number of dots jetted from the ink cartridge 1b (step S5), and inputs a count Yn representative of the number of ink dots to the ink quantity calculating section 2.

The ink quantity calculating section 2 calculates a new residual ink quantity (number of ink dots) Yb=Ya−Yn by use of the ink capacity (number of ink dots) Ya of the cartridge type read from the fundamental data storing section 3 and the value Yn received from the ink-dot number counting section 5 (step S6).

The ink quantity memory control section 6 stores the new residual ink quantity (number of ink dots) Yb, which is obtained by the ink quantity calculating section 2, into a memory location of the identifying code (002) in the ink quantity storing section 4 in an updating manner (step S7).

The ink quantity calculating section 2 causes the display section 7 to display the residual ink quantity (number of ink dots) Ya in the ink cartridge 1b that is read out of the ink quantity storing section 4, and a residual ink quantity (number of ink dots) Yb in the ink cartridge 1b which is calculated by the ink quantity calculating section 2 while printing. From the display, the user visually knows an ink level of ink left at present in the ink cartridge 1b attached to the printer. Therefore, he can check whether a sufficient quantity of ink is left in the ink cartridge before printing.

The ink quantity calculating section 2 calculates the residual ink quantities Xa, Ya, . . . of the ink cartridges 1a, 1b, . . . thus replaced, and further judges whether or not the calculated residual ink quantities Xa, Ya, . . . reach predetermined numbers of ink dots (step S10). Here, the predetermined number of ink dots section such a quantity of ink in a cartridge as to allow the printer to produce a predetermined number of prints, and it is preset in the machine in advance.

When the ink quantity calculating section judges that the residual ink quantity Xa (Yb) reaches the predetermined number of ink dots, the alarming section 8 buzzers or generates an electronic sound to show the depletion of the cartridge to the user (step S11). In this case, the display section 7 may also display an instruction of replacing the cartridge with another.

Thus, the ink-level detecting apparatus constructed according to the present invention has the follow advantage. In case where the printer is operated while selectively using different types of ink cartridges attached thereto as the current printing condition requires, the ink-level detecting apparatus can proper detect an ink level of ink remaining in an cartridge even when an ink cartridge that is already used is attached again to the printer.

In the above-mentioned embodiment, a residual ink quantity associated with the identifying code is stored in the ink quantity storing section 4. If required, the ink quantity storing section may be replaced with dot-number storage section for storing an accumulation of the numbers of ink dots specified by identifying codes. In this case, the ink quantity calculating section 2 calculates a residual ink quantity by use of an accumulation value (of the number of ink dots) read out of the dot-number storage section, a count (of the number of ink dots) produced from the ink-dot number counting section 5, and an ink capacity read out of the fundamental data storing section 3 as follows:

ink capacity−accumulation value−count value.

Further, the ink quantity memory control section 6 stores a value of:

accumulation value+count value as a new accumulation value into a memory location of the identifying code in the ink quantity storing section 4 in an updated manner.

Description has been made about the operation of the ink-level detecting apparatus in the case that one cartridge is attached to one printer. In a case where two cartridges are attached to one printer, the process of steps S1 to S11 is repeated for each cartridge.

The ink-level detecting apparatus may be included in the printer or in the host computer connected to the printer. In case where the ink-level detecting apparatus is included in the host computer to which a plurality of printers are connected, if an ink cartridge attached to one printer is removed therefrom and attached to another printer, the ink-level detecting apparatus can accurately detect a residual ink level in the ink cartridge.

While the ID of the ink cartridge is of the serial type in the above-mentioned embodiment, it may be of any type if both of the cartridge type information and the identifying code are indicated and can be accessed by the ink quantity calculating section 2.

Figure 3:
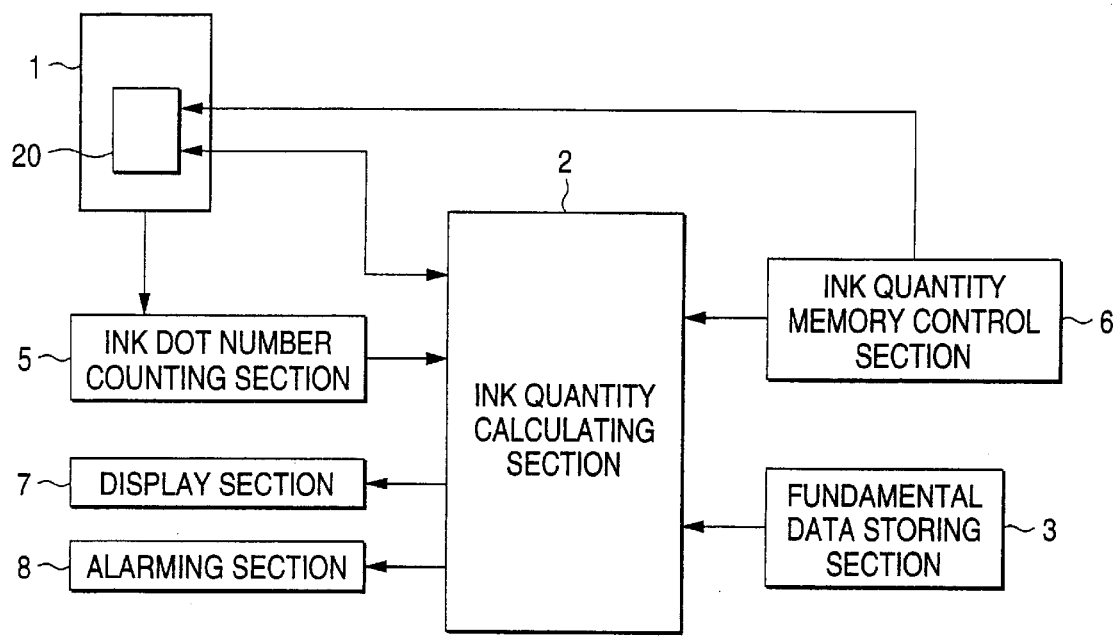
FIG. 3 is a block diagram showing an electrical configuration of a second embodiment according to an ink-level detecting apparatus of the present invention.

FIG. 3 is a block diagram showing an electrical configuration of an ink-level detecting apparatus according to a second embodiment of the present invention, which is applied to an ink cartridge with a nonvolatile memory (e.g., NVRAM) for storing cartridge type information.

In the ink-level detecting apparatus, a residual ink quantity and cartridge type information as well are written into a nonvolatile memory 20 attached to the ink cartridge 1. Therefore, the ink-level detecting apparatus does not need the ink quantity storing section 4 used in the device shown in FIG. 1. The output signal of the ink quantity memory control section 6 is led to the nonvolatile memory 20. In this embodiment, residual ink quantities are directly written into the nonvolatile memory 20 (i.e., the ink cartridge per se contains residual ink level data). Therefore, there is no need for the identifying codes for specifying individual cartridges. The remaining arrangement of the embodiment is substantially the same as the corresponding one of the embodiment shown in FIG. 1.

The process for detecting the residual ink quantity is substantially the same as the process consisting of the steps S1 to S11 except that residual ink quantities calculated by the ink quantity calculating section 2 are stored into the nonvolatile memory 20 in an updated manner (i.e., the step S7 in FIG. 2).

As has been described heretofore, according to the present invention, even when an ink cartridge attached to one printer is detached from the same and another ink cartridge being already used is attached to the same, the ink-level detecting apparatus can exactly detect a residual ink quantity in the ink cartridge.

According to the present invention, the user visually knows an ink level of ink left at present in the ink cartridge attached to the printer. Therefore, he can check whether a sufficient quantity of ink is left in the ink cartridge before printing.

According to the present invention, the user can know that ink is depleted in the ink cartridge attached to the printer, from the alarm sound. Further, if he fails to see the display of the display section, he can check whether a sufficient quantity of ink is left in the ink cartridge before printing.

According to the present invention, in case where the ink-level detecting apparatus is included in the host computer to which a plurality of printers are connected, if an ink cartridge attached to one printer is removed therefrom and attached to another printer, the ink-level detecting apparatus can accurately detect a residual ink level in the ink cartridge.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An ink level detecting apparatus comprising:

an ink cartridge, which is to be mounted in a printer, having an ID including cartridge type information and an identifying code;

a fundamental data storing section for previously storing cartridge type information and ink capacity information associated therewith of ink cartridges which are to be mounted in the printer;

a counting section for counting the number of ink dots jetted from the ink cartridge;

an ink quantity storing section for storing residual ink quantities in ink cartridges mounted on the printer in association with identifying codes thereof;

an ink quantity calculating section for reading the ID of the ink cartridge mounted in the printer to read out the residual ink quantity from the ink quantity storing section based on the identifying code in the ID, to read out the ink capacity from the fundamental data storing section based on the type information in the ID when the residual ink quantity associated with the identifying code is absent in the ink quantity storing section, and to thus calculate new residual ink quantity based on the number of ink dots counted by the counting section and one of the residual ink quantity read from the ink quantity storing section and the ink capacity read from the fundamental data section; and an ink quantity memory control section for storing the new residual ink quantities calculated by the ink quantity calculating section into the ink quantity storing section in an updating manner.

2. The ink level detecting apparatus as set forth in claim 1, further comprises a display section for displaying the residual ink quantity of the ink cartridge mounted on the printer which is stored in the ink quantity storing section according to the identifying code in the ID of the ink cartridge.

3. The ink level detecting apparatus as set forth in claim 1, further comprises an alarming section for generating an alarm when the calculated residual ink quantity is lower than a predetermined quantity level.

4. The ink level detecting apparatus as set forth in claim 1, wherein the apparatus is mounted on the printer in which the cartridge is to be mounted.

5. The ink level detecting apparatus as set forth in claim 1, wherein the apparatus is mounted on a host computer to which a plurality of printers in which the cartridge is to be mounted.

6. An ink level detecting apparatus comprising:

an ink cartridge, which is to be mounted in a printer, having an ID including cartridge type information and an identifying code;

a fundamental data storing section for previously storing cartridge type information and ink capacity information associated therewith of ink cartridges which are to be mounted in the printer;

a counting section for counting the number of ink dots jetted from the ink cartridge;

a dot number storing section for storing an accumulation of the numbers of jetted ink dots of ink cartridges mounted on the printer in association with identifying codes thereof;

an ink quantity calculating section for reading the ID of the ink cartridge mounted in the printer to read out the accumulated dot number from the dot number storing section based on the identifying code in the ID, to read out the ink capacity from the fundamental data storing section based on the type information in the ID, and to thus calculate new residual ink quantity based on the number of ink dots counted by the counting section, the accumulated ink dot number read from the dot number storing section and the ink capacity read from the fundamental data section; and an ink quantity memory control section for storing new accumulated ink dot number, which is obtained by the ink dot number counted by the counting section, into the dot number storing section.

7. The ink level detecting apparatus as set forth in claim 6, further comprises a display section for displaying the residual ink quantity of the ink cartridge mounted on the printer which is stored in the ink quantity storing section according to the identifying code in the ID of the ink cartridge.

8. The ink level detecting apparatus as set forth in claim 6, further comprises an alarming section for generating an alarm when the calculated residual ink quantity is lower than a predetermined quantity level.

9. The ink level detecting apparatus as set forth in claim 6, wherein the apparatus is mounted on the printer in which the cartridge is to be mounted.

10. The ink level detecting apparatus as set forth in claim 6, wherein the apparatus is mounted on a host computer to which a plurality of printers in which the cartridge is to be mounted.

* * * * *